Nov. 16, 1965 N. A. ZELLMER 3,218,480

EXPANDER CIRCUIT UTILIZING HALL MULTIPLIER

Filed Sept. 3, 1963 2 Sheets-Sheet 1

INVENTOR.
NEALE A. ZELLMER

BY

Lippincott, Ralls & Hendricson
ATTORNEYS

INVENTOR.
NEALE A. ZELLMER
BY
Lippincott, Ralls & Hendricson
ATTORNEYS 3,218,480
Patented Nov. 16, 1965

3,218,480

EXPANDER CIRCUIT UTILIZING HALL MULTIPLIER

Neale A. Zellmer, Belmont, Calif., assignor, by mesne assignments, to Automatic Electric Laboratories, Inc., Northlake, Ill., a corporation of Delaware Filed Sept. 3, 1963, Ser. No. 306,110
5 Claims. (Cl. 307—88.5)

The present invention relates generally to expander circuits of the type employed at the receiving end of a transmitting system to expand the amplitudes of signals previously compressed at the transmit end for transmission by the system, and is more particularly directed to an improved expander circuit which employs a Hall multiplying device to provide an increased dynamic range and materially improved linearity of input-output characteristics, and yet does not require critical or selected components to provide these advantageous results.

Many transmitting system can satisfactory accommodate only a limited range of signal amplitudes. During signal transmission, the quietest parts of the signal amplitudes must be well above the noise level of the system, while the loudest part of the signal must have amplitudes below the system overload level. The dynamic range of the signal thus may well exceed the dynamic range of the transmission system, and therefore it has become common practice to employ various compressor-expander systems (commonly referred to as compandors) for compressing the amplitude range of the input signal on the transmit end and then expanding the signal on the receive end of the transmission system. The combined result of the compressor and expander effectively improves the transmitting system signal-to-noise ratio. In telephone systems, the application of these compandors enables toll quality transmission over circuits which would otherwise be unsuitable because of excessive noise and/or cross-talk.

Conventionally, compandoring has been accomplished by using a lattice configuration of four carefully matched semiconductor diodes as a controlled variolosser, i.e., a circuit which varies the effective impedance to in turn vary the transmisison loss of a network in response to an external applied control signal. In this regard, it is common knowledge that the impedance of semiconductor diodes is a function of the instantaneous current level through the diode. More particularly, the dynamic impedance of a diode varies inversely with the current level. As applied to compressors or expanders, a control current is generated to control the variable impedance of the semiconductor diodes of the variolosser which are incorporated into a resistive network of the transmitting system. The control current is so generated that the variation in insertion loss of the network, due to the variable impedance of the variolosser, varies to give the required compression or expansion action. The variable impedance of a forward biased base-to-emitter transistor junction with respect to current flow has also been applied in a similar manner for compandoring.

Conventional compressor or expander circuits of the foregoing type suffer from the major disadvantage that carefully selected or matched semiconductor components are required in the variolosser portion of the circuit. In addition, the semiconductor devices employed in the variolosser are limited in the amount of A.-C. signal power they can tolerate without materially degrading the linearity of the signal. As a result, the dynamic range of the expander (or compressor) is limited. Furthermore, the linearity of the input-output characteristics of expanders employing networks of semiconductor devices in a variolosser arrangement leaves something to be desired.

The present invention overcomes the foregoing difficulties encountered with conventional expanders by providing an improved expander circuit wherein a Hall multiplier device is arranged to function as a variolosser for providing the expansion action. A Hall multiplier is a device that exploits a phenomenon discovered by the physicist, Edward Hall, and subsequently named the Hall effect for its discoverer. More particularly the Hall effect is the development of a transverse electric potential gradient in a current carrying conductor upon the applicaiton of a magnetic filed. This transverse potential gradient is referred to as the Hall voltage and is proportional to the cross-product of the magnetic field and the current passing through the conducting element. In a Hall multiplier, this effect is advantageously provided by a crystal of semiconductor material which serves as the current conductor and is mounted rigidly perpendicular to a magnetic path. Crystal current and magnetic field generating current are then employed as inputs to the multiplier and the Hall voltage developed transverse to the current flow through the crystal is derived as the output. Hence, an output is provided which is directly proportional to the product of the two inputs. Inasmuch as the crystal employed in the multiplier is a monolithic polycrystalline structure, the multiplier is, in contrast to the normal junction type nonlinear devices associated with semiconductors, a very linear device. A Hall multiplier is arranged in accordance with the invention hereof to provide an expansion action by applying the A.-C. signals carried by a transmitting system to one input of the multiplier and a rectified component of the signals proportional to the amplitudes thereof to the other input of the multiplier. The output of the multiplier is then an A.-C. signal corresponding in frequency to the A.-C. signal of the transmitting system, but having amplitudes which are directly proportional to the squares of the amplitudes of the transmission system signal. Through appropriate adjustment of circuit components, the output signal amplitude may be made equal to the square of the transmitting system signal. The R.M.S. value of the output signals from the multiplier is then also equal to the R.M.S. value of the square of the transmitting system signal, and in terms of relative levels there is thus produced a two-to-one expansion action. Through employment of additional Hall multipliers with their magnetic field or control windings in series and their crystals cascaded, higher expansion ratios may be obtained. By virtue of the linearity of the Hall multiplier devices, expander circuits in accordance with the present invention are extremely linear. Moreover, it is to be noted that the expandei circuits do not involve critical or selected components and relatively large dynamic ranges are attainable therewith.

The invention is illustrated with respect to several preferred embodiments in the drawings, wherein.

Figure 1:
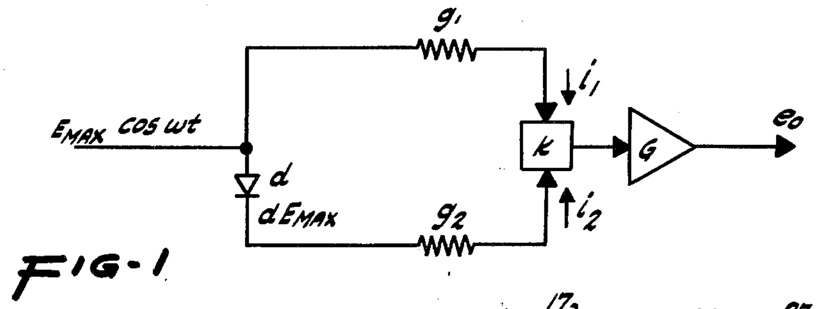
FIGURE 1 is a functional equivalent schematic of an expander circuit in accordance with the invention.

Considering now the expander circuit of the present invention as to the general principles thereof and referring to FIGURE 1, it is to be noted that $k$ designates a Hall multiplier to one input of which a current $i_1$ is applied through a first circuit path including a conductance $g_1$, and which receives a signal $E_{max} \cos \omega t$ from a transmitting system. A current $i_2$ is likewise applied to the second input of the Hall multiplier through a second circuit path including a rectifier $d_1$ and a conductance $g_2$ in series, and which also receives the signal $E_{max} \cos \omega t$. The output of the Hall multiplier is applied to an amplifier, designated by G, wherefrom an output voltage $e_o$ is derived.

It will be appreciated that the output voltage $e_o$ is given by the expression: $e_o = Gki_1i_2$, G and $k$ being respectively the gain of the output amplifier and a multiplication constant of the Hall multiplier.

However, the current $i_1$ is given by:

$$i_1 = E_{max}g_1 \cos \omega t$$

and the current $i_2$ is given by: $i_2 = dE_{max}g_2$, $d$ being a constant of proportionality of the rectifier and the quantity $dE_{max}$ being the D.-C. voltage output of the rectifier.

Therefore, substituting these expressions of currents in the foregoing expression for the output voltage, $e_o$, the output voltage is given by: $e_o = Gkdg_1g_2(E_{max}^2) \cos \omega t$. The output voltage is thus a sinusoidal function and may be expressed as: $e_o = (E_o)_{max} \cos \omega t$. Then, $$(E_o)_{max} \cos \omega t = Gkdg_1g_2(E_{max}^2) \cos \omega t$$

Now, with the quantity $Gkdg_1g_2$ set equal to 1 by appropriate adjustment of the circuit parameters, particularly the gain G of the output amplifier, the expression becomes: $(E_o)_{max} \cos \omega t = (E_{max}^2) \cos \omega t$. Thus, the amplitude of the output voltage signal is equal to the square of the amplitude of the input, or transmitting system, signal, and the R.M.S. values of the output and input voltage signal are correspondingly related. Then, in terms of relative level, the output signal represents a two-to-one expansion of the input signal level. In other words, for every db rise or fall of level in the transmitting system signal at the input of the expander, there is a corresponding two db rise or fall of level at the output.

Figure 2:
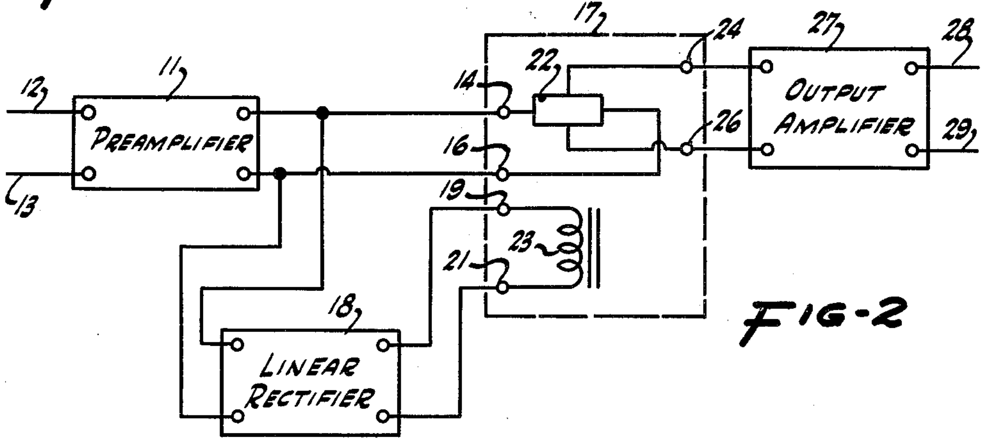
FIGURE 2 is a block diagram of a two-to-one expander circuit in accordance with the invention.

With the foregoing in mind, a two-to-one expander circuit in accordance with the present invention may be provided as illustrated in FIGURE 2. This expander preferably includes a preamplifier 11 whose input is arranged for connection to a transmitting system which may include, for example, conductors 12 and 13 of a telephone system or the like. The output terminals of the preamplifier are connected to crystal current input terminals 14 and 16 of a Hall multiplier 17. The output of the preamplifier 11 is also coupled to the input of a linear rectifier 18, and the output of the rectifier is in turn connected to magnet current input terminals 19 and 21 of the Hall multiplier 17. Thus, alternating current signals carried by the telephone system conductors 12 and 13, as amplified by the preamplifier 11, are applied to the crystal current input terminals 14 and 16 of the multiplier 17, as well as to the input terminals of the linear rectifier 18. The terminals 14 and 16 are connected to the opposite ends of the semiconductor crystal 22 of the multiplier, and, accordingly, a current flows through the crystal which is proportional to the alternating current signal at the output of the preamplifier 11. The voltage appearing at the output of the linear rectifier 18 is, of course, a direct current voltage having a magnitude proportional to the amplitude of the alternating current signal at the output of the preamplifier 11. Inasmuch as the terminals 19 and 21 of the multiplier 17 are connected to the opposite ends of a magnet winding 23 thereof, the rectified output voltage of the rectifier gives rise to a proportional direct current flow through the winding 23. A magnetic field is in turn generated due to this current flow which is hence proportional to the amplitude of the alternating current voltage signal at the output of the preamplifier, and this magnetic field is transverse to the direction of current flow through the crystal 22. The Hall voltage which is generated between opposite sides of the crystal 22, and is proportional to the cross-product of the current flowing through the crystal and the transverse magnetic field, is provided at output terminals 24 and 26 of the mutliplier 17. This Hall output voltage is consequently proportional to the product of the alternating current voltage signal at the output of the preamplifier 11, and the amplitude of this signal. In other words, the voltage appearing between terminals 24 and 26 is proportional to the square of the signal at the output terminals of the preamplifier 11, and therefore to the square of the signal transmitted by the telephone system conductors 12 and 13. This voltage between terminals 24 and 26 is preferably coupled to the input of an output amplifier 27, whose output may in turn be coupled to conductors 28 and 29 of terminal equipment of the telephone system, or the like.

It will be appreciated that the signal applied to the conductors 28 and 29 is of the form mathematically expressed hereinbefore. In order that the signal at conductors 28 and 29 be equal to the square of the signal at conductors 12 and 13, the over-all proportionality constant of the circuit must be adjusted equal to one, as is evident from the discussion of the mathematics previously set forth. Such adjustment may be readily accomplished in the instant circuit by appropriate adjustment of the gains of preamplifier 11 and output amplifier 27 until the magnitude of the signal at conductors 28 and 29 is observed to be equal to the square of a signal at conductors 12 and 13. A two-to-one expansion ratio of signal levels is thereby provided between the telephone system conductors 12 and 13 and the terminal equipment conductors 28 and 29. The Hall multiplier 17 is an extremely linear device and, moreover, is able to withstand relatively large signals without the introduction of distortion. Accordingly, the expander may be employed with signals having a relatively large dynamic range, while the output-input characteristics of the circuit are substantially linear.

The principles of the invention may also be adapted to the provision of expander circuits having higher expansion ratios than two-to-one. In this regard, reference is made to FIGURE 3 which illustrates a three-to-one expander circuit. As in the case of the two-to-one expander previously described, the three-to-one expander preferably includes a preamplifier 31 which has its output coupled to crystal current input terminals 32 and 33 of a Hall multiplier 34, and also coupled to the input of a linear rectifier 36. Here again, the output of the rectifier is coupled to magnet current input terminals 37 and 38 of the Hall multiplier 34. As a result, the terminals 32 and 33, and 37 and 38 of the multiplier are respectively energized with an alternating curcuit signal proportional to that applied to the input of the preamplifier 31 from telephone system conductors 39 and 41, or the like, and with a direct current signal proportional to the amplitude of the alternating current signal. The Hall multiplier 34 of the present system, however, is modified from the conventional type of Hall multiplier 17 employed in the expander circuit of FIGURE 2. More particularly, the multiplier 34 includes two Hall crystals 42 and 43 which are within the control of the same magnetic field which is generated in response to the flow of current through the magnet winding 44 connected between terminals 37 and 38. The opposite ends of the crystal 42 are connected to terminals 32 and 33 and the crystal 43 is connected in cascade with the crystal 42. More particularly, opposite sides of the crystal 42 are connected to the ends of the crystal 43 such that the Hall voltage of the former establishes current flow through the latter. Opposite sides of the crystal 43 are in turn connected to output terminals 46 and 47 from which the Hall voltage of this crystal may be derived.

Figure 4:
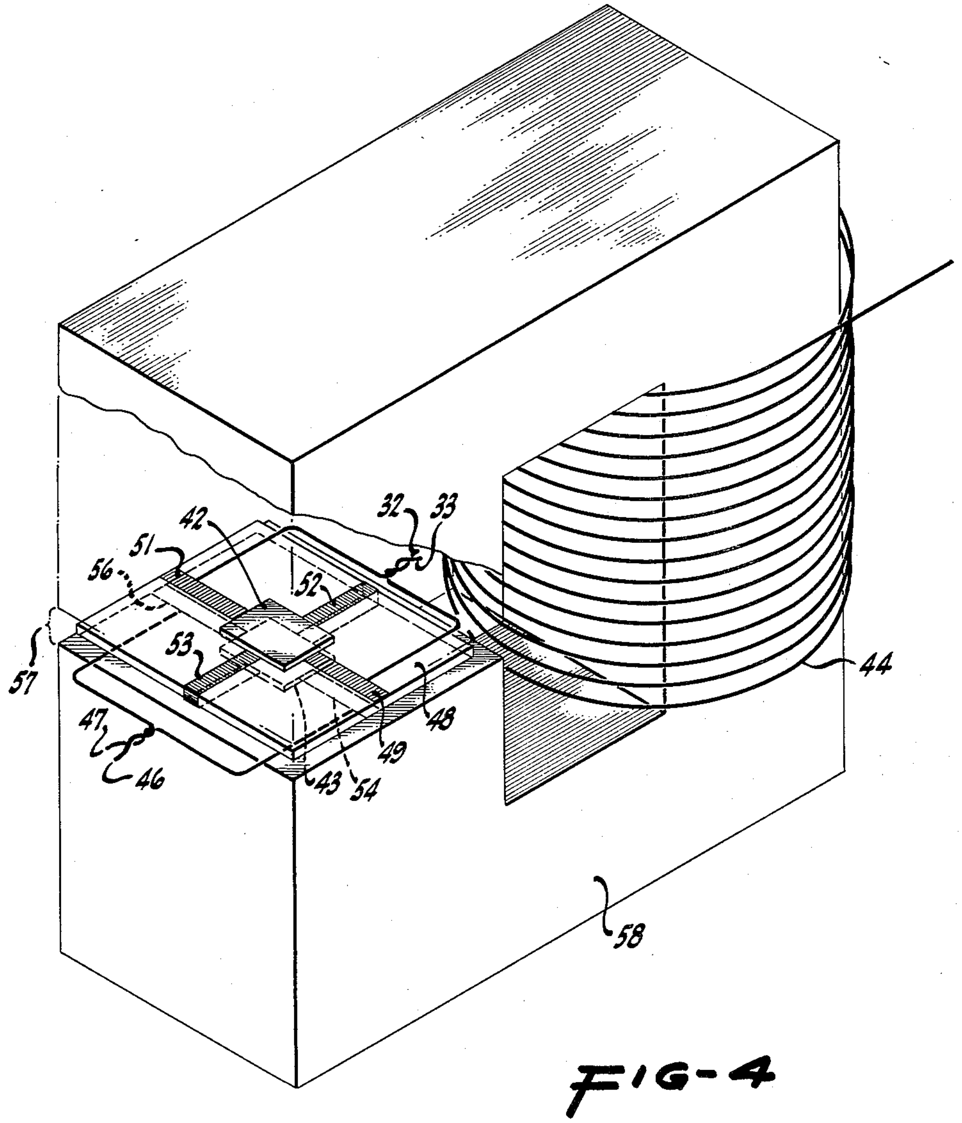
FIGURE 4 is a perspective view of a Hall multiplier particularly adapted for employment in the three-to-one expander circuit of FIGURE 3.

A preferred geometric configuration of the multiplier 34 is as illustrated in FIGURE 4. The multiplier includes a rectangular slab 48 of ferrite or, equivalent magnetic material. The crystals 42 and 43 are secured, with their longitudinal axes mutually perpendicular, to the opposite faces of the slab 48. Printed or etched conduction paths 49 and 51 extend from the opposite ends of crystal 42 longitudinally along the corresponding face of the slab 48 to its opposite end edges. The input terminals 32 and 33 are provided as leads in turn connected to the circuit paths 49 and 51. Printed or etched conduction paths 52 and 53 extend from the opposite side edges of the crystal 42 transversely outward along the corresponding face of the slab 48, around the side edges of the slab, and transversely inward along the opposite face of the slab to the opposite longitudinal ends of the crystal 43. Thus, the conduction paths 52 and 53 couple the Hall voltage generated transversely of the crystal 42 to the opposite longitudinal ends of the crystal 43. Printed or etched conduction paths 54 and 56 then extend from the side edges of the crystal 43 longitudinally outward along the corresponding face of the slab 48. The output terminals 46 and 47 are provided as leads connected to the conduction paths 54 and 56. The slab and crystal assembly is mounted in the air gap 57 of the core 58 of an electromagnet, or the like, upon which the winding 44 is wound. The magnetic field established in the core 58 upon energization of the winding 44 thus extends through the crystals 42 and 43 in perpendicular relation to their faces.

Although the Hall multiplier 34 is preferably provided in the manner just described with respect to FIGURE 4, it will be appreciated that an equivalent arrangement is provided by two conventional Hall multipliers with their magnet windings connected in series and their crystals cascaded. In either case, in the three-to-one expander circuit of FIGURE 3, the output of the multiplier is preferably coupled to an output amplifier 59 which is in turn coupled to conductors 61 and 62 of terminal equipment, or the like.

Figure 3:
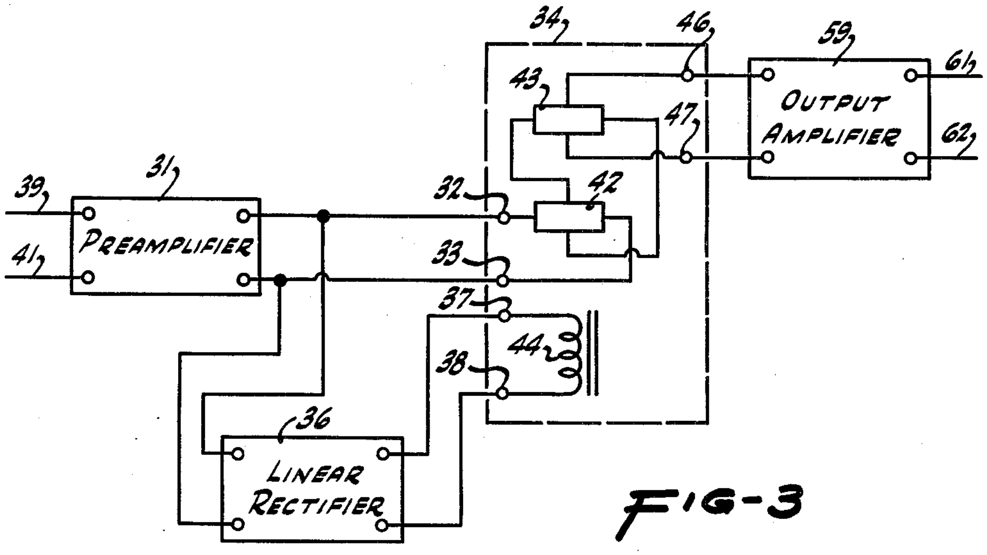
FIGURE 3 is a block diagram of an expander circuit in accordance with the invention as modified to provide a three-to-one expansion ratio.

Considering now the operation of the three-to-one expander circuit of FIGURE 3, with a signal $$e_{in}=E_{max}\cos\omega t$$

transmitted by the conductors 39 and 41, a signal $e_1$ is produced at the output of preamplifier 31 which is given by: $e_1=G_1E_{max}\cos\omega t$, $G_1$ being the gain of the preamplifier. This signal, as rectified by linear rectifier 36, is applied to the winding 44 to in turn provide a magnetic flux density $\beta$ which is given by: $\beta=k_1G_1E_{max}$, $k_1$ being a constant of proportionality of the rectifier. At the same time the signal $e_1$ produces a current flow through the crystal 42 which is given by: $i_c=k_2G_1E_{max}\cos\omega t$, $k_2$ being a constant of proportionality due to the conductance of the circuit path. The Hall voltage $e_{H1}(t)$ at the output of the crystal 42 is proportional to the product of the current $i_c$ and the magnetic flux density $\beta$, and is therefore given by: $e_{H1}(t)=k_1k_2k_3G_1^2E_{max}^2\cos\omega t$, $k_3$ being a constant of proportionality of the multiplying action.

Inasmuch as the output $e_{H1}(t)$ of the crystal 42 establishes the current flow through the crystal 43, and both crystals are controlled by the same magnetic field, the output $e_{H2}(t)$ of the crystal 43 may be made proportional to the product of the flux density $\beta$ and the output signal $e_{H1}(t)$ of the crystal 42.

Therefore, $e_{H2}(t)$ is given by:

$$e_{H2}(t)=k_1^2k_2k_3k_4G_1^3E_{max}^3\cos\omega t$$

where $k_4$ is a constant of proportionality of the multiplying action occurring in crystal 43. The signal appearing in the terminal equipment conductors 61 and 62 is accordingly: $e_o(t)=k_1^2k_2k_3k_4G_1^3G_2E_{max}^3\cos\omega t$, $G_2$ being the gain of the output amplifier 59. Thus, the output signal $e_o(t)$ is related to the cube of the input signal $e_{in}$ by a constant of proportionality which is equal to $$k_1^2k_2k_3k_4G_1^3G_2$$

The gains $G_1$ and $G_2$ of the preamplifier 31 and the output amplifier 59 are appropriately adjusted to provide an operating point in a linear region of the input-output characteristics of the multiplier 34 and at the same time to adjust the foregoing constant of proportionality equal to 1. The output signal is then equal to the cube of the input signal, and in terms of relative levels, a three-to-one expansion ratio is provided.

Although the invention has been described hereinbefore with respect to several preferred embodiments thereof, it will be appreciated that various modifications and changes may be made therein without departing from the spirit and scope of the invention, and thus it is not intended to limit the invention except by the terms of the following claims:

What is claimed is:

1. An expander circuit comprising a Hall multiplier for producing a Hall voltage, $e_o$, at output terminals proportional to the product of first and second signals, $i_1$ and $i_2$, at crystal and magnet input terminals; input means receiving a signal, $e_{in}$, from a transmitting system, said signal, $e_{in}$, being of the general form:

$$e_{in}=E_{max}\cos\omega t$$

where $E_{max}$ is the amplitude and $\omega t$ is the electrical angle of the signal; a first circuit path extending from said input means to the crystal terminals of said multiplier to provide said signal $i_1$, in the form:

$$i_1=g_1E_{max}\cos\omega t$$

$g_1$ being a constant of proportionality of the first circuit path; a second circuit path extending from said input means to the magnet input terminals of said multiplier, said second circuit path including a linear rectifier to provide said signal $i_2$ in the form:

$$i_2=dg_2E_{max}$$

$dg_2$ being a constant of proportionality of the second circuit path, said voltage, $e_o$, at the output terminals of said multiplier being thereby given by:

$$e_o=g_1g_2dkE^2_{max}\cos\omega t$$

$k$ being a constant of proportionality of said multiplier; and means adjusting the constants of proportionality, $g_1g_2dk$, of the over-all circuit equal to one, whereby the output voltage, $e_o$, is given by: $e_o=E^2_{max}\cos\omega t$.

2. An expander circuit comprising a preamplifier having its input coupled to a transmitting system to receive alternating current signals therefrom; a Hall multiplier having crystal current input terminals, magnet current input terminals, and Hall voltage output terminals; a linear rectifier having its output connected to said magnet current input terminals; means connecting the output of said preamplifier to the input of said rectifier and to said crystal current input terminals of said multiplier; an output amplifier connected to the output terminals of said multiplier; and means for adjusting the gains of said preamplifier and said output amplifier to provide signals at the output of said output amplifier equal to an integral exponential power of said signals received by said preamplifier from said transmitting system.

3. An expander comprising a magnetic circuit including a core with an air gap therein and a winding coupled to the core for generating a magnetic field through said air gap, a slab of magnetic material disposed in said air gap with its faces perpendicular to the direction of said magnetic field, first and second Hall crystals respectively secured to the opposite faces of said slab with the longitudinal axes of the crystals mutually perpendicular, first and second conduction paths extending from the opposite ends of said first crystal longitudinally outward along the corresponding face of said slab, third and fourth conduction paths extending from the opposite side edges of said first crystal transversely along the corresponding face of said slab and around the side edges thereof to extend transversely along the opposite face of said slab to the opposite ends of said second crystal, fifth and sixth conduction paths extending from the opposite side edges of said second crystal longitudinally outward along the corresponding face of said slab, input means for receiving alternating current signals from a transmitting system, a linear rectifier having its output connected in energizing relation to said winding, and means commonly connecting said input means in energizing relation to said first and second conduction paths and to the input of said rectifier to provide an output signal from said fifth and sixth conduction paths proportional to the cube of alternating current signals received by said input means.

4. An expander comprising a preamplifier having its input coupled to a transmitting system to receive alternating current signals therefrom, a linear rectifier having its input coupled to the output of said preamplifier, a magnetic circuit including a core with an air gap therein and a winding coupled to the core for generating a magnetic field through said air gap, a slab of magnetic material disposed in said air gap with its faces perpendicular to the direction of said magnetic field, first and second Hall crystals respectively secured to the opposite faces of said slab with the longitudinal axes of the crystals mutually perpendicular, first and second conduction paths extending from the opposite ends of said first crystal longitudinally outward along the corresponding face of said slab, third and fourth conduction paths extending from the opposite side edges of said first crystal transversely along the corresponding face of said slab and around the side edges thereof to extend transversely along the opposite face of said slab to the opposite ends of said second crystal, fifth and sixth conduction paths extending from the opposite side edges of said second crystal longitudinally outward along the corresponding face of said slab, means coupling the output of said preamplifier to said first and second conduction paths, means coupling the output of said rectifier to said winding, and an output amplifier coupled to said fifth and sixth conduction paths, said preamplifier and said output amplifier having gains to provide signals at the output of said output amplifier equal to the cube of said signals received by said preamplifier from said transmitting system.

5. An expander comprising input terminals adapted to receive a varying input voltage signal, a pair of like closely-spaced semiconducting crystals aligned in close proximity with the longitudinal axes of the crystals mutually perpendicular, means connecting said input terminals across two sides of a first of said crystals for establishing a current flow therebetween, a linear rectifier connected across said input terminals, a field coil disposed in close proximity to said crystals in perpendicular relationship thereto, means connecting the output of said linear rectifier across said field coil for establishing a magnetic field extending through said crystals perpendicular to current flow paths therein for producing a Hall voltage across each crystal perpendicular to the magnetic field and the current flow path, means connecting the Hall voltage of said first crystal across the second of said crystals, an output means connected across said second crystal to establish therebetween a Hall voltage proportional to the cube of the input voltage of said input terminals.

References Cited by the Examiner

UNITED STATES PATENTS

| | | | |
|---|---|---|---|
| 2,585,707 | 2/1952 | Warner. | |
| 2,752,434 | 6/1956 | Dunlap. | |
| 3,097,296 | 7/1963 | Chasmar et al. | 307—88.5 |
| 3,121,788 | 2/1964 | Hilbinger. | |

FOREIGN PATENTS

| | | |
|---|---|---|
| 618,580 | 4/1961 | Canada. |

JOHN W. HUCKERT, *Primary Examiner.*

ARTHUR GAUSS, *Examiner.*